United States Patent
Movshovitz-Attias et al.

(10) Patent No.: US 10,535,141 B2
(45) Date of Patent: Jan. 14, 2020

(54) DIFFERENTIABLE JACCARD LOSS APPROXIMATION FOR TRAINING AN ARTIFICIAL NEURAL NETWORK

(71) Applicant: Google LLC, Mountain View, CA (US)

(72) Inventors: Yair Movshovitz-Attias, Mountain View, CA (US); Elad Edwin Tzvi Eban, Mountain View, CA (US)

(73) Assignee: Google LLC, Mountain View, CA (US)

( * ) Notice: Subject to any disclaimer, the term of this patent is extended or adjusted under 35 U.S.C. 154(b) by 150 days.

(21) Appl. No.: 15/889,440

(22) Filed: Feb. 6, 2018

(65) Prior Publication Data

US 2019/0244362 A1 Aug. 8, 2019

(51) Int. Cl.
G06T 7/11 (2017.01)
G06T 7/136 (2017.01)
G06N 3/08 (2006.01)
G06N 3/04 (2006.01)

(52) U.S. Cl.
CPC .......... G06T 7/136 (2017.01); G06N 3/0481 (2013.01); G06N 3/08 (2013.01); G06T 7/11 (2017.01); *G06T 2207/20081* (2013.01)

(58) Field of Classification Search
None
See application file for complete search history.

(56) References Cited

U.S. PATENT DOCUMENTS

2019/0130573 A1* 5/2019 Xu ............................. G06T 7/11
2019/0156154 A1* 5/2019 Tu .......................... G06K 9/6262

OTHER PUBLICATIONS

Jiang, R.—"Neural network for satellite image segmentation"—Toward Data Science Aug. 27, 2017, pp. 1-7 (Year: 2017).*

* cited by examiner

*Primary Examiner* — Bernard Krasnic
(74) *Attorney, Agent, or Firm* — McDonnell Boehnen Hulbert & Berghoff LLP

(57) ABSTRACT

Systems and methods described herein may relate to training an artificial neural network (ANN) using a differentiable Jaccard Loss approximation. An example embodiment may involve obtaining a training image and a corresponding ground truth mask that represents a desired segmentation of the training image. The embodiment may further involve applying an ANN on the training image to generate an output segmentation of the training image that depends on a plurality of weights of the ANN and determining a differentiable Jaccard Loss approximation based on the output segmentation of the training image and the ground truth mask. The embodiment also involves modifying one or more weights of the ANN based on the differentiable Jaccard Loss approximation and providing a representation of the ANN as modified to a mobile computing device.

17 Claims, 10 Drawing Sheets

420
↓

| 1 | 1 | 1 | 0 | 0 |
|---|---|---|---|---|
| 0 | 1 | 1 | 1 | 0 |
| 0 | 0 | 1 | 1 | 1 |
| 0 | 0 | 1 | 1 | 0 |
| 0 | 1 | 1 | 0 | 0 |

*

422
↓

| 1 | 0 | 1 |
|---|---|---|
| 0 | 1 | 0 |
| 1 | 0 | 1 |

=

424
↓

| 4 | 3 | 4 |
|---|---|---|
| 2 | 4 | 3 |
| 2 | 3 | 4 |

Figure 4B

DIFFERENTIABLE JACCARD LOSS APPROXIMATION FOR TRAINING AN ARTIFICIAL NEURAL NETWORK

BACKGROUND

An artificial neural network (ANN) is a computational model in which a number of simple units, working individually in parallel and without central control, combine to solve complex problems. While this model may resemble an animal's brain in some respects, analogies between ANNs and brains are tenuous at best. Modern ANNs have a fixed structure, a deterministic mathematical learning process, are trained to solve one problem at a time, and are much smaller than their biological counterparts. Due to their ability to systematically classify and approximate, ANNs are often used for image processing to enhance or create an artistic rendering of an input image. Training an ANN to perform image processing techniques as well as other processes, however, typically involves computationally-intensive processes that require long periods of time to complete.

SUMMARY

Systems and methods described herein involve training ANNs and other machine learning processes using a differentiable Jaccard Loss approximation. Training an ANN to perform a task often involves the use of a loss function. Through an iterative learning process, parameters of the ANN are adjusted based on the loss function until the ANN produces desired outputs. Since an ANN often consists of non-linear functions, the loss function used should be differentiable in order to allow backpropagation, gradient descent, or another training technique to be used to train the ANN. Differentiable loss functions typically used to train an ANN, such as the per-pixel softmax loss function, often fail to factor the overall accuracy of matches between predicted outputs from an ANN and desired results. This failure, in turn, results in slow convergence increasing the overall amount of resources and time required to train the ANN. The differentiable Jaccard Loss approximation presented herein, however, overcomes this problem by factoring the overall accuracy between an ANN's predicted results and the corresponding desired results, enabling overall training time to be reduced while also improving the performance of the ANN.

Accordingly, a first example embodiment may involve obtaining, by a computing system, a training image, and obtaining, by the computing system, a ground truth mask corresponding to the training image. The ground truth mask might represent a desired segmentation of the training image. The first example embodiment may further include applying an ANN to the training image to generate an output segmentation of the training image. Particularly, the output segmentation of the training image depends on a plurality of weights of the ANN. The first example embodiment may also include determining a differentiable Jaccard Loss approximation based on the output segmentation of the training image and the ground truth mask, and based on the differentiable Jaccard Loss approximation, modifying one or more weights of the ANN. The first example embodiment may also include providing a representation of the ANN as modified to a mobile computing device.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a system may include one or more processors and a non-transitory computer-readable medium, configured to store instructions, that when executed by the one or more processors, cause the system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 4B depicts a convolution, in accordance with example embodiments

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Example Computing Devices and Cloud-Based Computing Environments

The following embodiments describe architectural and operational aspects of example computing devices and systems that may employ the disclosed ANN implementations, as well as the features and advantages thereof.

Figure 1:
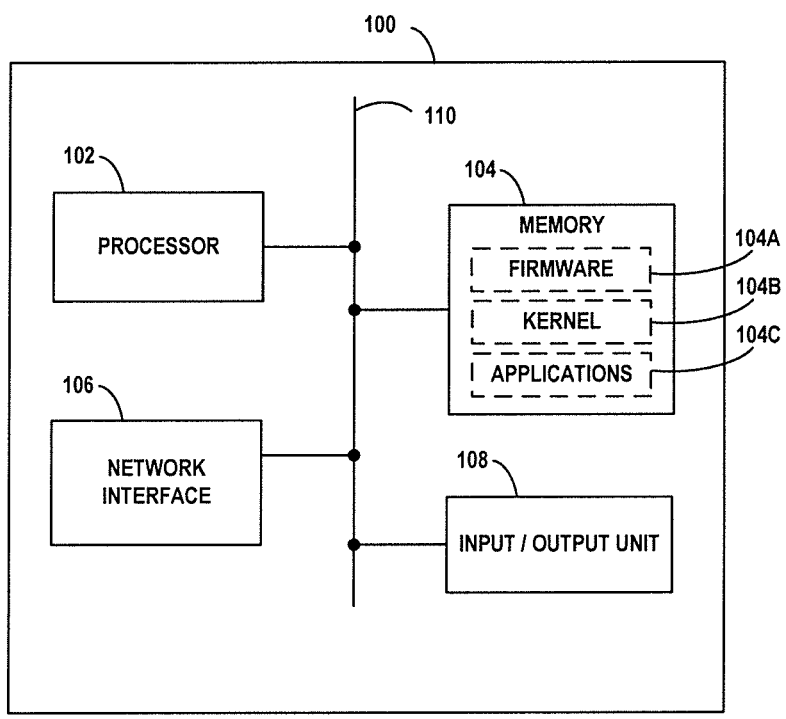
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
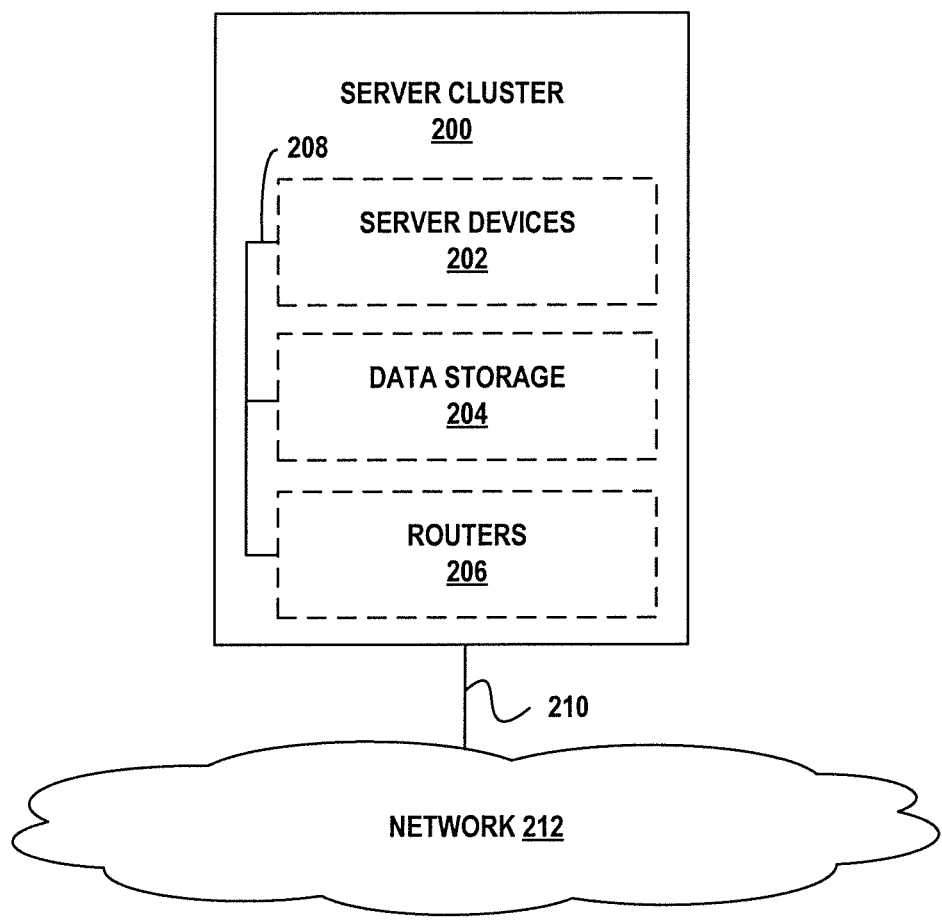
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Networks

A. Example ANN

An ANN is a computational model in which a number of simple units, working individually in parallel and without central control, combine to solve complex problems. An ANN is represented as a number of nodes that are arranged into a number of layers, with connections between the nodes of adjacent layers.

Figure 3A:
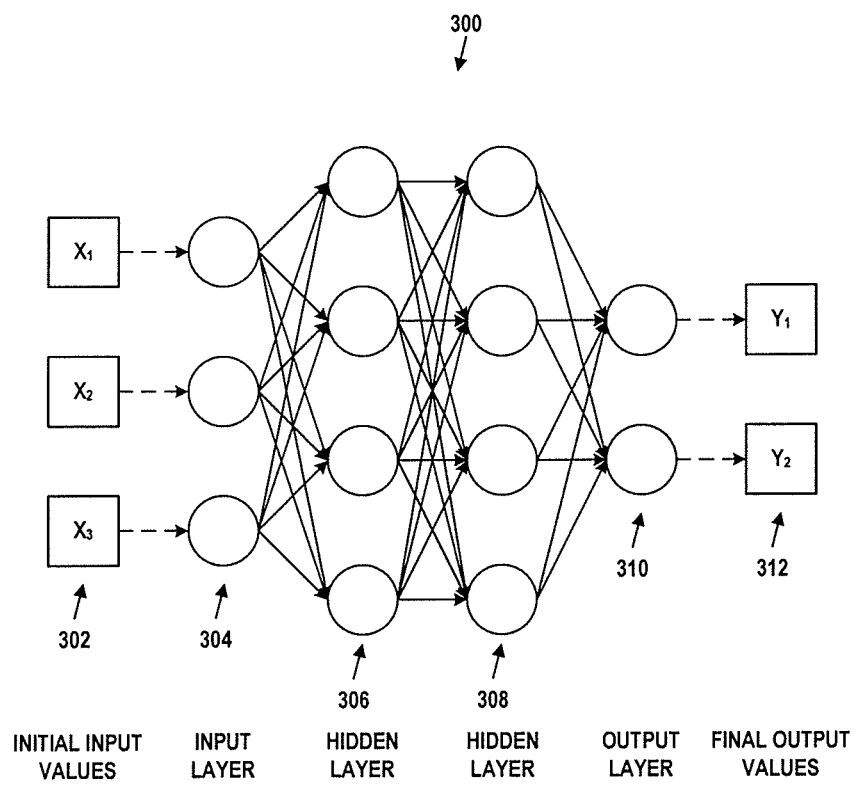
FIG. 3A depicts an ANN architecture, in accordance with example embodiments.
Figure 3B:
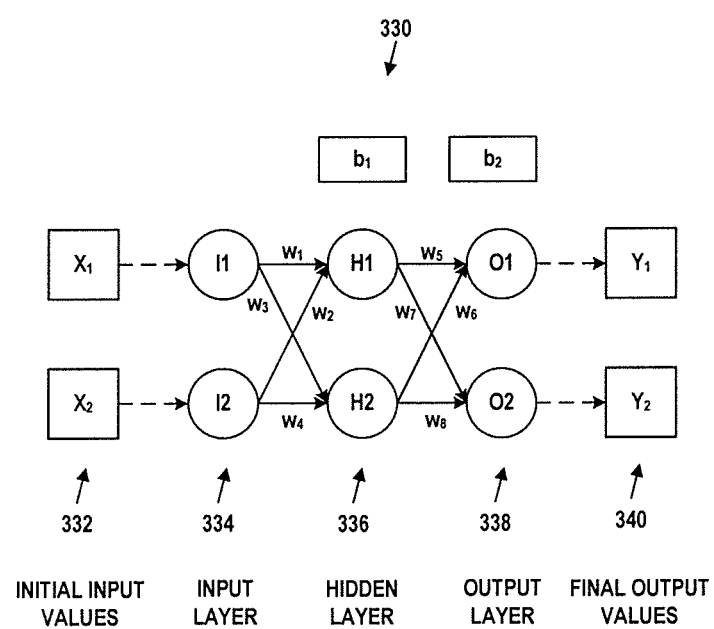
FIG. 3B depicts training an ANN, in accordance with example embodiments.

An example ANN 300 is shown in FIG. 3. ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements). In further examples, ANN 300 can learn to perform other tasks, such as computer vision, risk evaluation, etc.

Regardless, ANN 300 consists of four layers: input layer 304, hidden layer 306, hidden layer 308, and output layer 310. The three nodes of input layer 304 respectively receive $X_1$, $X_2$, and $X_3$ from initial input values 302. The two nodes of output layer 310 respectively produce $Y_1$ and $Y_2$ for final output values 312. ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots w_n\}$, the dot-product sum d may be determined as:

$$d = \sum_{i=1}^{n} x_i w_i + b \qquad (1)$$

Where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tan h functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN usually involves providing the ANN with some form of supervisory training data, namely sets of input values and desired, or ground truth, output values. For example, supervisory training to enable an ANN to perform image processing tasks can involve providing pairs of images that include a training image and a corresponding ground truth mask that represents a desired output (e.g., desired segmentation) of the training image. For ANN 300, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \qquad (3)$$

Where i=1 ... m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 300 and producing associated output values. A loss function is used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values. In other example embodiments, the differentiable Jaccard Loss approximation described in detail below can serve as the loss function used to train ANN 300.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training images generates new outputs that more closely match the ground truth masks that correspond to the training images.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

In order to further explain error determination and backpropagation, it is helpful to look at an example of the process in action. However, backpropagation becomes quite complex to represent except on the simplest of ANNs. Therefore, FIG. 3B introduces a very simple ANN 330 in order to provide an illustrative example of backpropagation.

TABLE 1

| Weight | Nodes |
|---|---|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \quad (4)$$

Applying the activation function (here, the logistic function) to this input determines that the output of node H1, $out_{H1}$ is:

$$out_{H1} = \frac{1}{1 + e^{-net_{H1}}} \quad (5)$$

Following the same procedure for node H2, the output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \quad (6)$$

Thus, output for node O1, $out_{O1}$ is:

$$out_{O1} = \frac{1}{1 + e^{-net_{O1}}} \quad (7)$$

Following the same procedure for node O2, the output $out_{O2}$ can be determined. At this point, the total error, $\Delta$, can be determined based on a loss function. For instance, the loss function can be the sum of the squared error for the nodes in output layer 508. In other words:

$$\Delta = \Delta_{O1} + \Delta_{O2} = \frac{1}{2}(out_{O1} - \hat{Y}_1)^2 + \frac{1}{2}(out_{O2} - \hat{Y}_2)^2 \quad (8)$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins. In another example, $\Delta$ can be determined based on other loss functions, such as the differentiable Jaccard Loss approximation described in depth below.

2. Backpropagation

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \qquad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, aft over several thousand feed forward and backpropagation iterations, the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyperparameters of the system (e.g., the biases $b_1$ and $b_2$ and the learning rate a) are adjusted. For instance, the setting the learning rate closer to a particular value may result in the error rate being reduced more rapidly. Additionally, the biases can be updated as part of the learning process in a similar fashion to how the weights are updated.

Regardless, ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

In some embodiments, the training process involves use of the differentiable Jaccard Loss approximation to test modifications to the weights of ANN 330. The multiple uses of the differentiable Jaccard Loss approximation can be compared to determine if prior modifications to the weights of ANN 330 are reducing overall error.

A. Convolutional Neural Networks

CNNs are similar to ANNs, in that they consist of some number of layers of nodes, with weighted connections therebetween and possible per-layer biases. The weights and biases may be updated by way of feed forward and backpropagation procedures discussed above. A loss function, such as the differentiable Jaccard Loss function described herein, may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 4A:
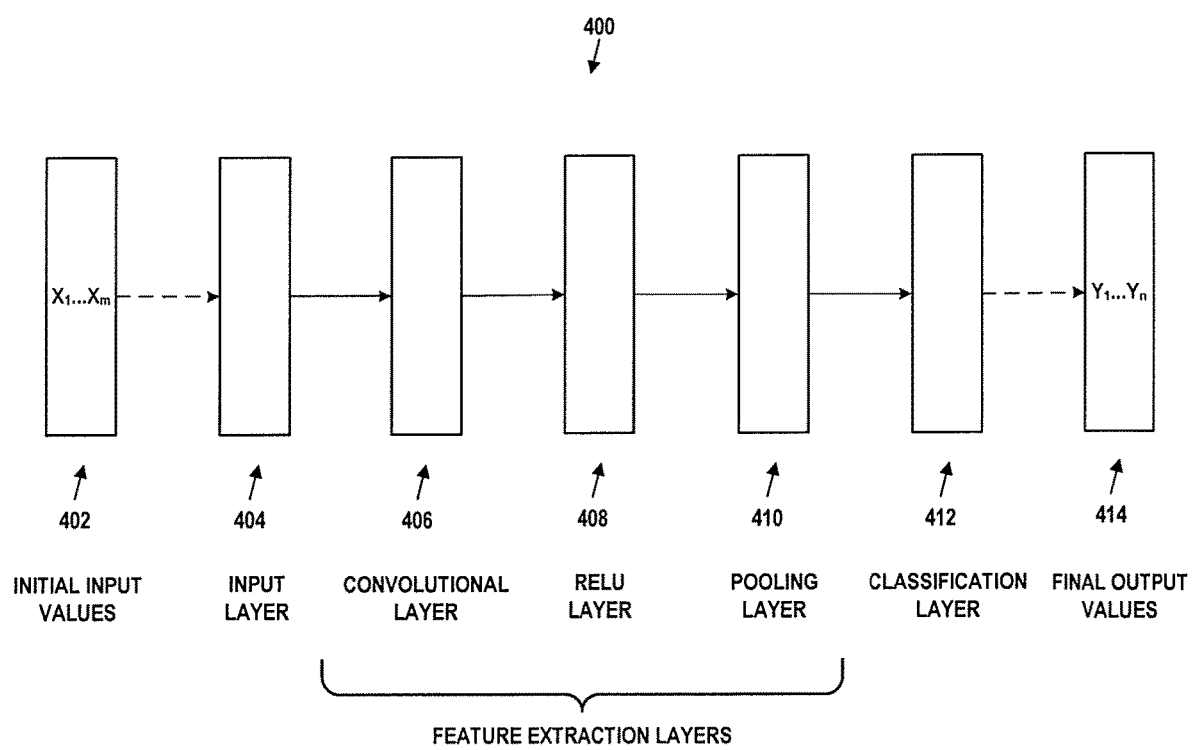
FIG. 4A depicts a convolution neural network (CNN) architecture, in accordance with example embodiments.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as an feature map) in which the width and height can have the same size as those of the input values, or one or more of these dimensions may have different size. The combination of each filter's output results in layers of feature maps in the depth dimension, in which each layer represents the output of one of the filters.

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyperparameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide the best results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by downsampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

Figure 5A:
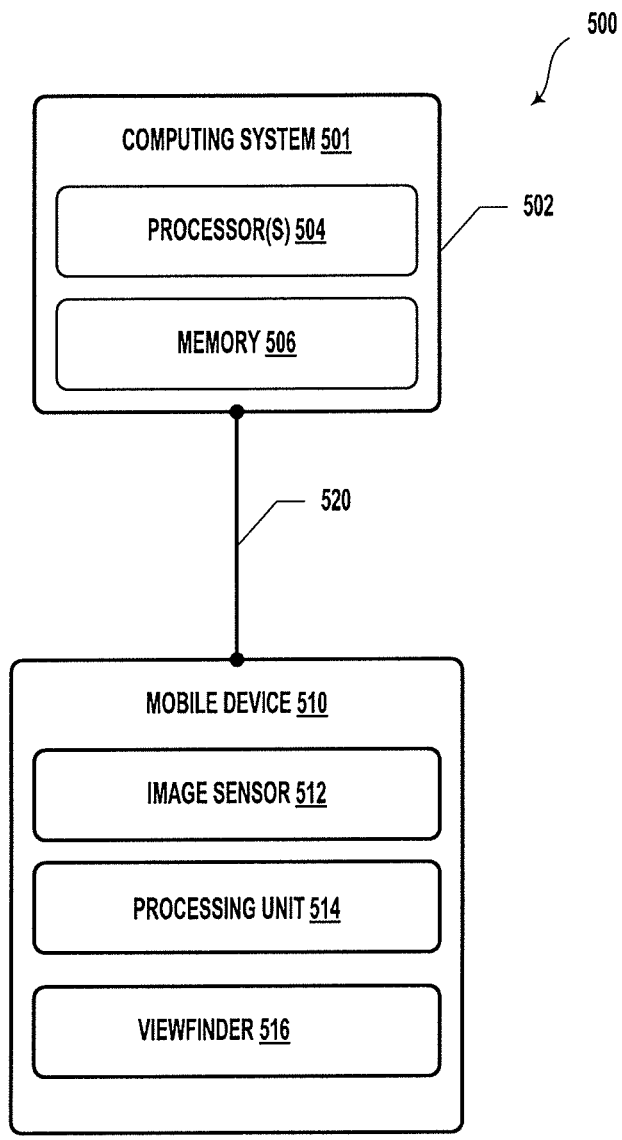
FIG. 5A depicts a system involving an ANN and a mobile device, in accordance with example embodiments.

FIG. 5A depicts system 500 involving ANN 502 operating on computing system 501 and mobile device 510 in accordance with example embodiments.

ANN 502 may correspond to ANN 300 or ANN 330 described above. For example, ANN 502 could be configured to execute instructions so as to carry out operations, including image processing tasks. In some examples, ANN 502 may represent a CNN (e.g., CNN 400), a feedforward ANN, a gradient descent based activation function ANN, or a regulatory feedback ANN, among other types.

As an example, ANN 502 could determine a plurality of image processing parameters or techniques based on a set of training images. For example, ANN 502 could be subject to a machine-learning process to "learn" how to manipulate images like human professionals. The set of training images could include numerous image pairs. For instance, ANN 502 could analyze 1,000-10,000 image pairs. Each of the image pairs could include an "original" image (also referred to herein as an input image) and a corresponding ground truth mask that represents the desired qualities for the original image to have. In some instances, the ground truth mask represents the desired segmentation of the training image. In further examples, the ground truth mask can represent other desired qualities for the corresponding input image to have after an application of ANN 502.

Masks are often used in image processing and can involve setting the pixel values within an image to zero or something other background value. For instance, a mask image can correspond to an image where some of the pixel intensity values are zero, and other pixel values are non-zero (e.g., a binary mask that uses "1's" and "0's"). Wherever the pixel intensity value is zero in the mask image, then the pixel intensity of the resulting masked image can be set to the background value (e.g., zero). To further illustrate, an example mask may involve setting all pixels that correspond to an object in the foreground of an image to white and all pixels that correspond to background features or objects to black. Prediction masks can correspond to estimated segmentations of an image (or other estimated outputs) produced by an ANN. The prediction masks can be compared to a ground truth mask, which can represent the desired segmentation of the input image.

In an example embodiment, the ground truth mask could be developed and adjusted by humans using image processing/manipulation programs such as Adobe Lightroom, Adobe Photoshop, Adobe Photoshop Elements, Google Picasa, Microsoft Photos, DxO OpticsPro, Corel PaintShop Pro, or Apple Photos. In other examples, the ground truth mask could be developed by one or more previously trained ANNs. For instance, the ground truth mask could be determined using multiple iterations of an ANN. In another example, the ground truth mask could be generated based on a combination of an ANN and additional adjustments by a human. It will be understood that other types of image processing software are possible and contemplated herein. Alternatively, the image pairs could represent adjustment of original images using preset or random filters or other image adjustment algorithms.

During the machine-learning process, ANN 502 could determine a set of "weights" representative of different types of image manipulations made by humans (or more computationally-complex processing). More specifically, these weights could be associated with various image parameters, such as exposure, clarity, contrast, sharpness, hue, saturation, color, chromatic aberration, focus, tint, white balance, color mapping, HDR tone mapping, etc. The weights can also impact segmentation, semantic segmentation, or other image processing techniques applied by ANN 502. It will be understood that weights associated with other image parameters are possible. Over time, and with a sufficient number of training images, ANN 502 could develop these weights as a set of image processing parameters that could be used for representations of ANN 502. In other examples, the weights of ANN 502 can depend on other tasks that ANN 502 is being trained to perform.

During the machine-learning process, training ANN 502 to produce desired results can involve using the differentiable Jaccard Loss approximation as the loss function used to modify one or more weights of ANN 502. In other examples, the differentiable Jaccard Loss approximation can be used as an activation function within ANN 502. As such, to determine the differentiable Jaccard Loss approximation, an initial understanding of the Jaccard Similarity and how the differentiable Jaccard Loss approximation is derived is helpful. Accordingly, FIG. 5B depicts an application of the Jaccard Similarity in accordance with example embodiments.

Figure 5B:
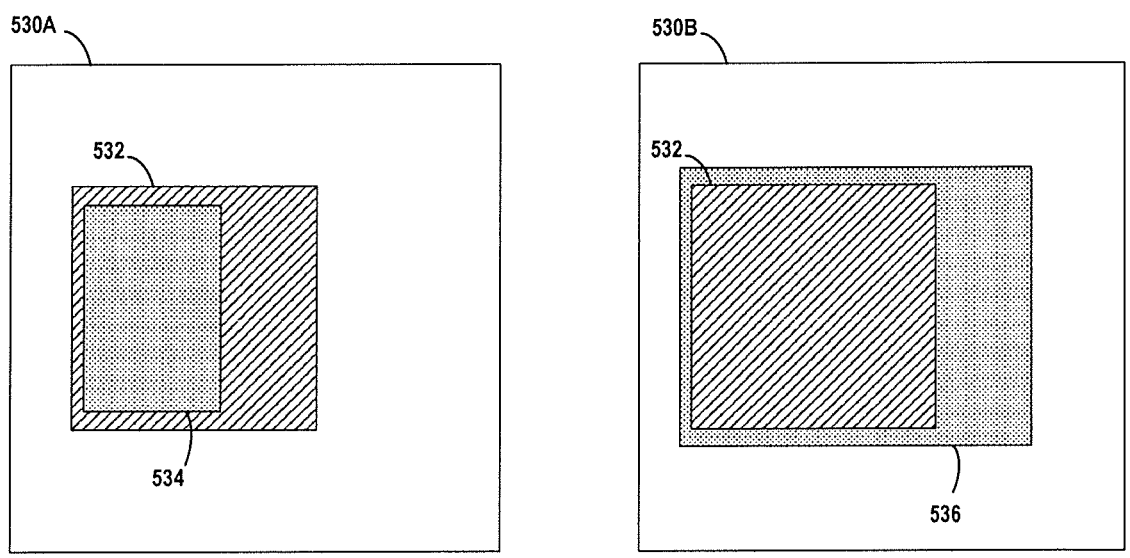
FIG. 5B depicts an application of the Jaccard Similarity, in accordance with example embodiments.

Images 530A, 530B shown in FIG. 5B represent images depicting scenes with an object positioned as a focal point within each image. For illustration purposes, images 530A, 530B each include 1,000 pixels total. Particularly, the object is shown approximately segmented as represented by ground truth mask 532, which is an area of 200 pixels or approximately 20% of each image 530A, 530B.

Images 530A, 530B further include predictions 534, 536, respectively, that represent predicted masks. Predictions 534, 536 specify example segmentation of images 530A, 530B that attempt to segment the position of the object in each image. As such, the accuracy of each of the corresponding predictions (e.g., predictions 534, 536) relative to ground truth mask 532 is analyzed using the Jaccard Similarity. The Jaccard Similarity measures the similarity between finite sample sets (e.g., finite sample sets A, B) and is defined as the size of the intersection divided by the size of the union of the sample sets as described:

$$J(A, B) = \frac{A \cap B}{A \cup B} \quad (10)$$

When the Jaccard Similarity is used to measure the accuracy of the segmentation of an input image, A represents the predicted segmentation mask of an object in the input image and B represents the corresponding ground truth mask. For example, with regard to image 530A, prediction 534 corresponds to A in the Jaccard Similarity and is shown as 100 pixels that capture half of ground truth mask 532. Since prediction 534 is fully positioned within ground truth mask 532, prediction 534 produces 100 true positives, zero false positives, and 100 false negatives with respect to ground truth mask 532. The accuracy of a predicted mask relative to the ground truth can be calculated as described:

$$\text{Accuracy} = 1 - \frac{fp + fn}{N} \quad (11)$$

Where $fp$ represents false positive of the predicted mask relative to the ground truth, $fn$ represents false negative of the predicted mask relative to the ground truth, N represents the image area in number of pixels.

Using the equation for accuracy, prediction 534 is shown to be approximately 90% accurate overall with regards to correctly segmenting the position of object within image 530A (i.e., prediction 534 relative to ground truth 532).

To further evaluate the accuracy of the predictions relative to the ground truths, the Jaccard Similarity can be calculated as described:

$$\text{Jaccard Similarity} = \frac{tp}{P + fp} \quad (12)$$

Where tp represents true positive of the predicted mask relative to the ground truth, $fp$ represents false positive of the predicted mask relative to the ground truth, and P represents the ground truth.

Using Equation 12, the Jaccard Similarity indicates that prediction 534 yields a 50% score relative to ground truth mask 532 in image 530A.

Prediction 536 shown in image 530B is more aggressive than prediction 534. Particularly, predication 536 is shown fully-encompassing the object represented by ground truth 532 in image 530B. Here, a comparison between predication 536 and ground truth mask 532 in image 530B similar results in approximately 90% accuracy overall. Conversely, the Jaccard Similarity indicates that predication 536 yields a 66% score relative to ground truth mask 532 in image 530B. As shown, by judging the predictions 534, 536 relative to ground truth mask 532 in images 530A, 530B using the Jaccard Similarity, prediction 536 can be identified as the strategy that produces better results for image processing.

As shown above, although the general accuracy analysis performed above can show the accuracy of predictions relative to the ground truth mask, it may fail to show which prediction technique was better to use. Accordingly, the Jaccard Similarity offers another analysis option that can help select which prediction technique is preferred. In the example shown in FIG. 5B, prediction 536 produces a higher Jaccard Similarity indicating that this prediction strategy yields results closer to the desired ground truth 532 for images 530A, 530B.

Thus, the Jaccard Similarity can determine the accuracy of an image processing technique (e.g., segmentation). The Jaccard Similarity, however, is not differentiable making its use for training an ANN difficult. In particular, the Jaccard Similarity could not be used directly as a loss function that allows backpropagation or gradient descent to occur during training. The differentiable Jaccard Loss approximation presented herein, however, can be used for training an ANN.

The differentiable Jaccard Loss approximation represents a ratio of a true positive count of the output segmentation of a training image relative to the ground truth mask over a union between a cardinality of a binary vector of the differentiable Jaccard Loss approximation and a false positive count of the output segmentation of the training image relative to the ground truth mask. The true positive count can represent a first quantity of pixels in the output segmentation of the training image that accurately match corresponding pixels in the ground truth mask (i.e., the desired segmentation of the training image). Similarly, the false positive count can represent a second quantity of pixels in the output segmentation of the training image that fail to accurately match corresponding pixels in the ground truth mask.

In order to arrive at the differentiable Jaccard Loss approximation, a method is used to approximately maximize the Jaccard Similarity as described:

$$\max_w J(f(x, w), Y) \quad (13)$$

Where J represents the Jaccard Similarity, $f(x, w)$ represents the predicted mask, w represents the parameters (i.e., weights) of the model (i.e., ANN) generating the predictions, Y represents binary vector, and x as the input (e.g., input image).

As a result of maximizing the Jaccard Similarity, a multi-label classification problem is formed where Y represents a binary vector. Particularly, the problem can be cast as an intersection over union in terms of true positives and false positives, etc. The intersection may then be the true-positive count of function $f$ while the union is the cardinality of Y plus the false-positive counts of function $f$. This produces the following (integer) optimization problem as described:

$$J(f, Y) = \frac{tp}{|Y| + fp} \quad (14)$$

Where tp represents true positive count of the output segmentation of the training image relative to the ground truth mask, ƒp represents the false positive count of the output segmentation of the training image relative to the ground truth mask and Y represents the binary vector.

To develop the differentiable Jaccard Loss approximation based on the optimization problem above, $tp_{pl}$ can be used to further represent a lower bound on tp and $fp_{pu}$ can be used to represent an upper bound on ƒp. Using the bounds on tp and ƒp can produce the following lower-bounded function as described:

$$J(f, Y) \geq \overline{J(f, Y)} = \frac{tp_{pl}}{|Y| + fp_{pu}} \quad (15)$$

Thus, if the surrogate $\overline{J(f,Y)}$ shown above is differentiable, then it can be used as a loss function. Accordingly, the lower bound for tp can be described as:

$$tp = \Sigma_{i \in Y+} 1 - I(f(w,x_i) = y_i) \geq \Sigma_{i \in Y+} 1 - loss(f(w,x_i)y_i) = tp_{lp} \quad (16)$$

Where I represents an indicator function, and the loss function represents any smooth loss function that can serve as a lower limit for the loss function (e.g., zero one loss function) defined in the indicator function. For example, the loss function can be a hinge loss function, a sigmoid loss function, or other types of loss functions.

In some examples, the differentiable Jaccard Loss approximation can further include an upper bound for ƒp as described:

$$fp = \Sigma_{i \in Y-} I(f(w,x_i) = y_i) \leq \Sigma_{i \in Y-} loss(f(w,x_i)y_i) = fp_{pu} \quad (17)$$

Where I represents an indicator function, and the loss function (e.g., zero one loss function) represents any smooth loss that can serve as an upper limit for the zero-one loss function defined in the indicator function.

In some examples, the loss function in the upper bound for ƒp can be the same type of loss function used for the lower bound for true positive tp. For example, both loss functions can be hinge loss functions or sigmoid loss functions.

As shown, the lower bound for tp and, in some examples, the upper bound for ƒp enables the Jaccard Loss approximation to be differentiable. This enables the differentiable Jaccard loss approximation to be used as a loss function during training since it enables backpropagation or gradient descent to update weights of an ANN.

In some embodiments, the true positive count represents a first quantity of pixels in the output segmentation of the training image that accurately match corresponding pixels in the optimized segmentation of the training image and the false-positive count can represent a second quantity of pixels in the output segmentation of the training image that fail to accurately match corresponding pixels in the optimized segmentation of the training image represented by the ground truth mask. Thus, by using the differentiable Jaccard Loss approximation to train and reduce error rate of an ANN, overall training time can be reduced and performance by the ANN can be improved.

Referring back to FIG. 5A, ANN 502 is shown communicatively coupled to mobile device 510 by communication interface 520. Communication interface 520 could be configured to transmit information from ANN 502 to mobile device 510, or vice-versa. For example, a computing system may transmit a representation of ANN 502 to mobile device 510. The representation of ANN 502 can correspond to ANN 502 or a simplified version capable of operating on mobile device 510. Accordingly, mobile device 510 can use the representation to perform tasks, such as image processing techniques.

Communication interface 520 can include a wired and/or wireless communication link. As an example, communication interface 520 could be established over LTE or another cellular communication protocol, BLUETOOTH, BLUETOOTH LOW ENERGY, Wireless LAN, WiMAX, IEEE 802.11, ZIGBEE, or another type of communication protocol or method. Communication interface 520 could be configured to provide a bi-directional communication link between ANN 502 and mobile device 510. In some example embodiments, ANN 502 could transmit image processing parameters to mobile device 510.

Mobile device 510 could include image sensor 512 and at least one processing unit 514. In some embodiments, processing unit 514 could include software running on one or more central processing units (CPUs) and/or graphics processing units (GPUs). For instance, processing unit 514 could include a multi-core CPU. It will be understood that many other types of CPUs and GPUs are possible and contemplated in light of the present disclosure.

In cases where processing unit 514 includes a GPU, some image processing functions could be accelerated compared to CPUs. For example, a GPU may provide acceleration for texture mapping, rotation, translation, shading, and/or other image processing or image rendering functions. In some embodiments, processing unit 514 could include at least one application-specific integrated circuit (ASIC). Additionally or alternatively, processing unit 514 could include at least one virtual machine having at least one persistent disk or memory resource.

Mobile device 510 could also include viewfinder 516. In some example embodiments, viewfinder 516 may include a display of a smartphone. However, other types of displays are possible and contemplated.

Processing unit 514 may cause image sensor 512 to capture images. Additionally or alternatively, a user may select one or more images for image processing. The image(s) could include one or more image frames. In some embodiments, image sensor 512 may be configured to capture RAW images or another type of image format. Furthermore, some embodiments may include various graphical image formats, such as raster image formats (e.g., JPEG, TIFF, GIF, BMP, PNG, WebP, etc.), vector image formats (e.g., 2D/3D vector formats), stereoscopic image formats, or multiscopic image formats. Some images arranged in such graphical image formats may be compressed to varying degrees, for example according to lossless and/or lossy image file compression algorithms.

One popular use for ANNs is image processing. With more mobile devices equipped with cameras for capturing images, ANNs are often trained for image processing techniques, such as classification, feature extraction, pattern recognition, and image restoration and enhancement, among other processes. For example, an ANN may structurally segment or semantically segment an input image in a manner that provides an understanding of the image at the pixel level. In such an example, the ANN may use this understanding to further apply desired effects to the image, such as a synthetic blur that simulates the Bokeh effect by focusing upon an object in the foreground and blurring the background to make the image appear as if it was originally captured by a professional single-lens reflex (SLR) camera.

Image segmentation partitions a digital image into multiple segments (e.g., sets of pixels) to simplify the representation of the image into something easier to analyze and is often used to locate objects and boundaries (e.g., lines, curves, etc.) within the image. Every pixel within the image is assigned a label such that similarly-labeled pixels share particular characteristics or computed properties, such color, intensity, or texture. Semantic segmentation, which is slightly more complex than image segmentation, involves assigning every pixel in the input image to an object class in order to understand the image at the pixel level. For example, an ANN configured to semantically segment an image to differentiate between an object (e.g., a person) from other elements in the image (e.g., trees positioned behind the person) while also labeling pixels as corresponding to either the person, trees, or other elements identified in the image.

In further examples, similar methods can be used when training a neural network. For example, an optimization of the Jaccard loss in a deep neural network for image segmentation is described:

$$L = 1 - \sum_i \frac{p_i y_i}{p_i + y_i - p_i y_i} \qquad (18)$$

Where $p_i$ represents the predicted per pixel probabilities minus the output of the sigmoid layer and $y_i$ represents the label.

In other examples, a loss function for a convolution neural network (CNN) based segmentation of medical imaging data is described:

$$L = 1 - \sum_i \frac{p_i y_i}{p_i^2 + y_i^2 - p_i y_i} \qquad (19)$$

where $p_i$ represents the predicted per pixel probabilities minus the output of the sigmoid layer and $y_i$ represents the label. These loss functions, however, do not have lower bound limits that are included within the differentiable Jaccard Loss approximation and, thus, cannot assure that the Intersection over Union (IOU) loss is optimized.

III. Example Methods

Figure 6:
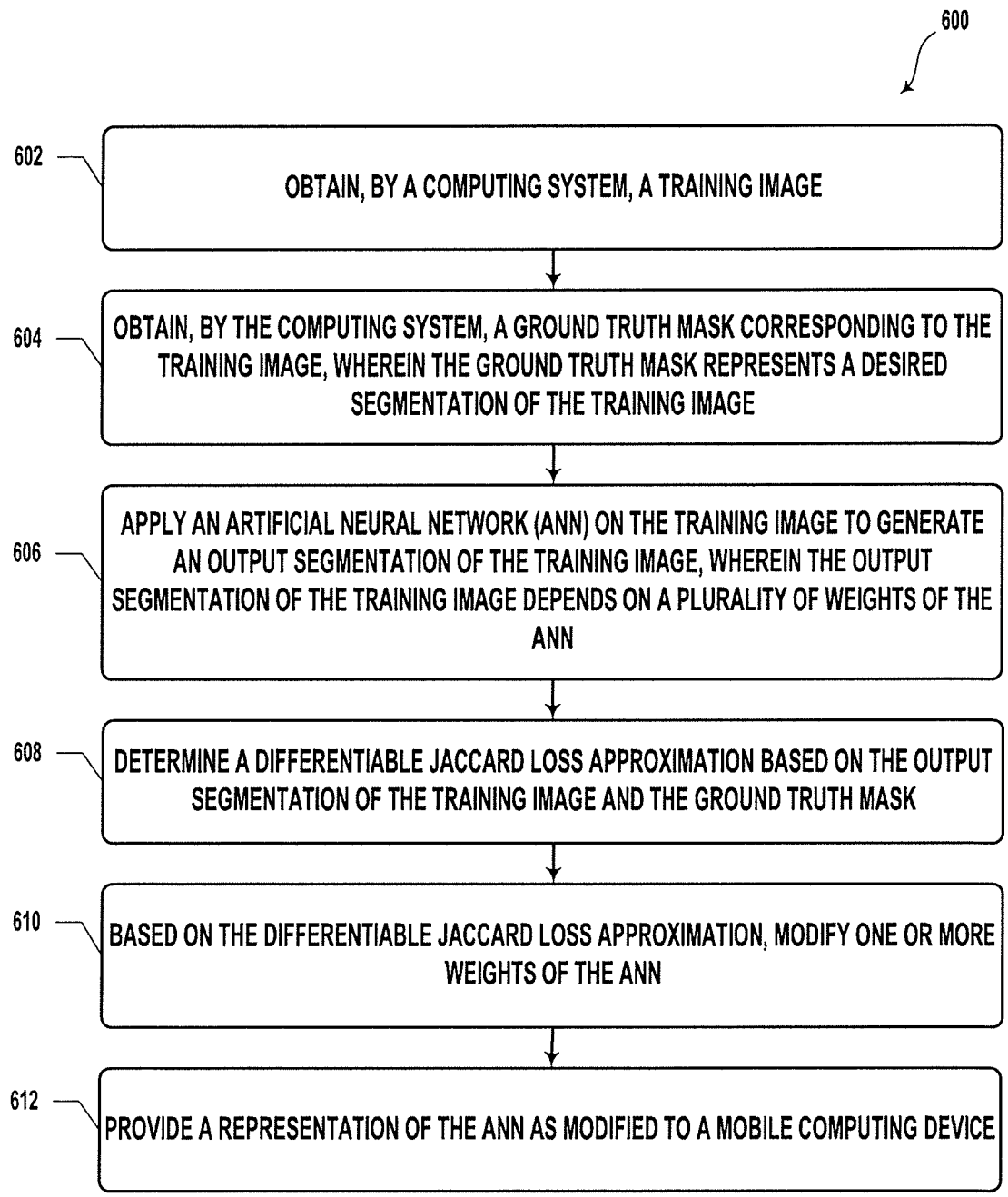
FIG. 6 is a flow chart, in accordance with example embodiments.

FIG. 6 illustrates method 600 in accordance with example embodiments. Method 600 may include various blocks or steps. The blocks or steps may be carried out individually or in combination. The blocks or steps may be carried out in any order and/or in series or in parallel. Further, blocks or steps may be omitted from or added to method 600.

Some or all blocks of method 600 may involve elements as illustrated and described in reference to FIGS. 1-5B. Furthermore, some or all blocks of method 600 may be carried out by an ANN, CNN, or another type of machine learning process. For instance, an embodiment may involve using a gradient descent based activation function ANN.

While examples herein may describe image processing of discrete images, it will be understood that the described systems and methods could be applied to video clips or video streams.

Block 602 includes obtaining, by a computing system, a training image. The computing system (e.g., server) can correspond to computing device 100 described in FIG. 1 or other possible types of computing systems. As such, the computing system receiving the training image may be associated with one or multiple ANNs. For instance, the computing system can cause application of an ANN upon the training image. In addition, the training image received by the computing system could be part of a set of training images, which can include dozens, hundreds, thousands of training images, etc.

Block 604 includes obtaining, by the computing system, a ground truth mask corresponding to the training image. The ground truth mask can represent a target output after application of an ANN to the training image. For example, the ground truth mask can represent a desired segmentation of the training image. In other examples, the ground truth mask can represent other modifications or enhancements to the corresponding training image. For example, the ground truth mask can represent changes in colors to features or other enhances that may be applied by an ANN upon a training image.

As an example, a training image can represent a scene that includes an object positioned in a foreground along with a background positioned behind the object. The corresponding ground truth mask can represent a desired segmentation of the scene that specifies differences between the object, the foreground, and the background. Particularly, the ground truth mask can highlight boundaries and associate the pixels that correspond to each element in the corresponding training image.

Figure 7:
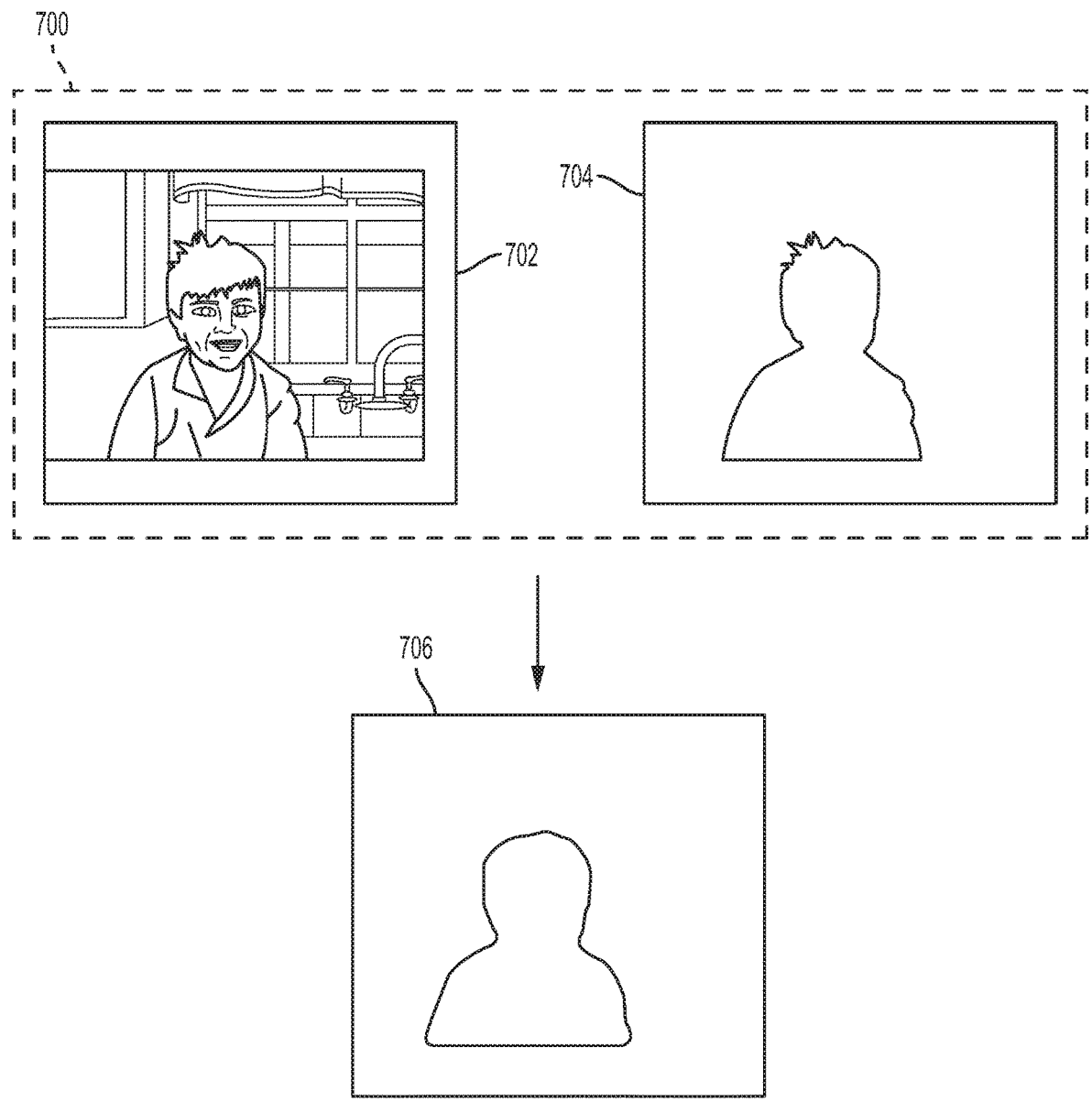
FIG. 7 depicts an application of an ANN trained using a differentiable Jaccard Loss approximation, in accordance with example embodiments.

To further illustrate, FIG. 7 depicts an application of an ANN trained using a differentiable Jaccard Loss approximation in accordance with example embodiments. In particular, a computing system associated with an ANN may receive pair 700 that includes both training image 702 and corresponding ground truth mask 704. Pair 700 may represent a set of corresponding images (e.g., an input image and desired output) that can be used to train the ANN via supervisory training.

As shown in pair 700, training image 702 depicts a person positioned in a kitchen setting and corresponding ground truth mask 704 represents an example desired segmentation of training image 702. As shown, ground truth mask 704 differentiates between the person positioned in the foreground of the scene and the background of the scene. To express the differences of elements, ground truth mask 704 uses black pixels to represent corresponding pixels in training image 702 that correspond to the background of the scene and further uses white pixels to represent corresponding pixels in training image 704 that represent the person (i.e., the focal point of training image 702). In other examples, a ground truth mask can use other colors or techniques to differentiate among elements in a scene captured within a corresponding training image.

Referring back to FIG. 6, block 606 includes applying an ANN on the training image to generate an output segmentation of the training image. The output segmentation of the training image depends on a plurality of weights of the ANN.

As shown in FIG. 7, predicted mask 706 represents an example output segmentation of training image 702 generated by an application of an ANN on training image 702. Predicated mask 706 includes some blur at pixels that correspond to pixels outlining the person in training image 702. This can signal that further training of the ANN is required in order to produce results that more closely resemble ground truth mask 704. In addition, predicated mask 706 also fails to clearly identify a portion of the person's hair as part of the person, which further signals more training is required in order to cause the ANN to produce results closer to ground truth mask 704. Thus, although predicated mask 706 approximately outlines the person in training image 702, further machine learning using the differentiable Jaccard loss approximation may enable the ANN to produce a subsequent predicted mask based on training image 702 that more closely resembles ground truth mask 704.

Referring back to FIG. 6, block 608 includes determining a differentiable Jaccard Loss approximation based on the output segmentation of the training image and the ground truth mask. Particularly, the differentiable Jaccard Loss approximation can represent a ratio of a true positive count of the output segmentation of the training image relative to the ground truth mask over a union between a cardinality of a binary vector of the differentiable Jaccard Loss approximation and a false positive count of the output segmentation of the training image relative to the ground truth mask. The true positive count may represent a first quantity of pixels in the output segmentation of the training image that accurately match corresponding pixels in the desired segmentation of the training image represented by the ground truth mask, and the false positive count may represent a second quantity of pixels in the output segmentation of the training image that fail to accurately match corresponding pixels in the desired segmentation of the training image represented by the ground truth mask.

The differentiable Jaccard Loss approximation can include a first smooth loss function that represents a lower limit for the true positive count of the output relative to the ground truth mask. For example, the first smooth loss can be a hinge loss function, a sigmoid loss function, or another type of loss function.

The differentiable Jaccard Loss approximation can also include a second smooth loss function that represents an upper limit for the false positive count of the output relative to the ground truth mask. In some examples, the second smooth loss function is the same as the first smooth loss function.

Block 610 includes, based on the differentiable Jaccard Loss approximation, modifying one or more weights of the ANN. Modifying the weights of the ANN can reduce the error rate to improve performance of the ANN. Some examples may involve modifying at least one weight of the ANN such that subsequent application of the ANN on the training image generates a second output segmentation of the training. As such, method 800 can further involve determining a second differentiable Jaccard Loss approximation based on the second output segmentation of the training and the ground truth mask. This second differentiable Jaccard Loss approximation can be greater than the first differentiable Jaccard Loss approximation.

With regard to FIG. 7, the ANN may be trained using the differentiable Jaccard Loss approximation to modify one or more weights of the ANN to reduce the errors in predicted masks generated based on training image 702. By modifying one or multiple weights of the ANN, subsequent applications of the ANN on training image 702 (or other training images) can cause new predicted masks to more closely resemble ground truth mask 704 (or corresponding ground truth masks for the other training images). In some examples, the ANN can be quickly trained using the differentiable Jaccard Loss approximation such that the ANN produces predicted masks that resemble the desired output represented by the ground truth masks (e.g., ground truth mask 704).

Block 612 includes providing a representation of the ANN as modified to a mobile computing device. The representation can correspond to a replica of the ANN or a modified version capable of operating on the mobile computing device. As a result, the mobile computing device can use the representation to enhance subsequent images captured by the camera of the mobile computing device.

The differentiable Jaccard Loss approximation can train particular types of ANNs as well as other machine learning processes. For instance, the differentiable Jaccard Loss approximation can train neural networks (e.g., CNNs), which are made up of deep, feed-forward ANNs that can be used to analyze input images. As another example, the differentiable Jaccard Loss approximation can be used to train a gradient descent based activation function ANN.

In addition, although examples are discussed with regards to training an ANN to perform image processing tasks, the differentiable Jaccard Loss approximation can be used to train an ANN to perform other tasks, such computer vision, speech recognition, machine translation, social network filter, and medical diagnosis, among others. Further, in some examples, the differentiable Jaccard Loss approximation can be used with other functions to train an ANN.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:
1. A method comprising:
obtaining, by a computing system, a training image;
obtaining, by the computing system, a ground truth mask corresponding to the training image, wherein the ground truth mask represents a desired segmentation of the training image;

applying an artificial neural network (ANN) on the training image to generate an output segmentation of the training image, wherein the output segmentation of the training image depends on a plurality of weights of the ANN;

determining a differentiable Jaccard Loss approximation based on the output segmentation of the training image and the ground truth mask, wherein the differentiable Jaccard Loss approximation represents a ratio of a true positive count of the output segmentation of the training image relative to the ground truth mask over a union between a cardinality of a binary vector of the differentiable Jaccard Loss approximation and a false-positive count of the output segmentation of the training image relative to the ground truth mask, wherein the true positive count represents a first quantity of pixels in the output segmentation of the training image that accurately match corresponding pixels in the desired segmentation of the training image represented by the ground truth mask, and wherein the false-positive count represents a second quantity of pixels in the output segmentation of the training image that fail to accurately match corresponding pixels in the desired segmentation of the training image represented by the ground truth mask;

based on the differentiable Jaccard Loss approximation, modifying one or more weights of the ANN; and providing a representation of the ANN as modified to a mobile computing device.

2. The method of claim 1, wherein the training image represents a scene, wherein the scene includes an object positioned in a foreground, and wherein the scene further includes a background positioned behind the object.

3. The method of claim 2, wherein the ground truth mask represents a desired segmentation of the scene, and wherein the desired segmentation of the scene specifies differences between the object, the foreground, and the background.

4. The method of claim 1, wherein the differentiable Jaccard Loss approximation further comprises:
a first smooth loss function that represents a lower limit for the true positive count of the output segmentation relative to the ground truth mask.

5. The method of claim 4, wherein the first smooth loss function is a hinge loss function.

6. The method of claim 4, wherein the first smooth loss function is a sigmoid loss function.

7. The method of claim 4, wherein the differentiable Jaccard Loss approximation further comprises:
a second smooth loss function that represents an upper limit for the false-positive count of the output segmentation relative to the ground truth mask.

8. The method of claim 7, wherein the second smooth loss function is the same as the first smooth loss function.

9. The method of claim 1, wherein the ANN is a gradient descent based activation function ANN.

10. The method of claim 1, wherein modifying one or more weights of the ANN comprises:
modifying at least one weight of the ANN such that subsequent application of the ANN on the training image generates a second output segmentation of the training image.

11. The method of claim 10, further comprising:
determining a second differentiable Jaccard Loss approximation based on the second output segmentation of the training image and the ground truth mask, wherein the second differentiable Jaccard Loss approximation is greater than the first differentiable Jaccard Loss approximation.

12. A non-transitory computer readable medium having stored therein instructions executable by a computing system to cause the computing system to perform operations comprising:
obtaining a training image;
obtaining a ground truth mask corresponding to the training image, wherein the ground truth mask represents a desired segmentation of the training image;
applying an artificial neural network (ANN) on the training image to generate an output segmentation of the training image, wherein the output segmentation of the training image depends on a plurality of weights of the ANN;
determining a differentiable Jaccard Loss approximation based on the output segmentation of the training image and the ground truth mask, wherein the differentiable Jaccard Loss approximation represents a ratio of a true positive count of the output segmentation of the training image relative to the ground truth mask over a union between a cardinality of a binary vector of the differentiable Jaccard Loss approximation and a false-positive count of the output segmentation of the training image relative to the ground truth mask, wherein the true positive count represents a first quantity of pixels in the output segmentation of the training image that accurately match corresponding pixels in the desired segmentation of the training image represented by the ground truth mask, and wherein the false-positive count represents a second quantity of pixels in the output segmentation of the training image that fail to accurately match corresponding pixels in the desired segmentation of the training image represented by the ground truth mask;
based on the differentiable Jaccard Loss approximation, modifying one or more weights of the ANN; and
providing a representation of the ANN as modified to a mobile computing device.

13. The non-transitory computer-readable medium of claim 12, wherein the training image represents a scene, wherein the scene includes an object positioned in a foreground, and wherein the scene further includes a background positioned behind the object.

14. The non-transitory computer-readable medium of claim 13, wherein the ground truth mask represents a desired segmentation of the scene, and wherein the desired segmentation of the scene specifies differences between the object, the foreground, and the background.

15. The non-transitory computer-readable medium of claim 12, wherein the differentiable Jaccard Loss approximation further comprises:
a first smooth loss function that represents a lower limit for the true positive count of the output segmentation relative to the ground truth mask.

16. The non-transitory computer-readable medium of claim 12, wherein the ANN is a convolution neural network (CNN).

17. A system comprising:
one or more processors; and
a non-transitory computer-readable medium, configured to store instructions, that when executed by the one or more processors, cause the system to perform operations comprising:

obtaining a training image;
obtaining a ground truth mask corresponding to the training image, wherein the ground truth mask represents a desired segmentation of the training image;
applying an artificial neural network (ANN) on the training image to generate an output segmentation of the training image, wherein the output segmentation of the training image depends on a plurality of weights of the ANN;
determining a differentiable Jaccard Loss approximation based on the output segmentation of the training image and the ground truth mask, wherein the differentiable Jaccard Loss approximation represents a ratio of a true positive count of the output segmentation of the training image relative to the ground truth mask over a union between a cardinality of a binary vector of the differentiable Jaccard Loss approximation and a false-positive count of the output segmentation of the training image relative to the ground truth mask, wherein the true positive count represents a first quantity of pixels in the output segmentation of the training image that accurately match corresponding pixels in the desired segmentation of the training image represented by the ground truth mask, and wherein the false-positive count represents a second quantity of pixels in the output segmentation of the training image that fail to accurately match corresponding pixels in the desired segmentation of the training image represented by the ground truth mask;
based on the differentiable Jaccard Loss approximation, modifying one or more weights of the ANN; and
providing a representation of the ANN as modified to a mobile computing device.

* * * * *